(12) United States Patent  
Matsuda

(10) Patent No.: US 7,409,169 B2
(45) Date of Patent: Aug. 5, 2008

(54) IMAGE FORMING APPARATUS AND IMAGE FORMING SYSTEM

(75) Inventor: Yoshihiro Matsuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 252 days.

(21) Appl. No.: 11/382,964

(22) Filed: May 12, 2006

(65) Prior Publication Data

US 2006/0262344 A1  Nov. 23, 2006

(30) Foreign Application Priority Data

May 18, 2005 (JP) .............................. 2005-144964

(51) Int. Cl.
G03G 15/08 (2006.01)
(52) U.S. Cl. .......................................... 399/27; 399/24
(58) Field of Classification Search ..................... 399/8, 399/9, 13, 24, 25, 26, 27, 31, 81
See application file for complete search history.

(56) References Cited

U.S. PATENT DOCUMENTS 6,370,341 B1 * 4/2002 Haines .......................... 399/24
7,292,794 B2 * 11/2007 Yoshizawa .................... 399/24

FOREIGN PATENT DOCUMENTS

JP 2004-098505 A 4/2004

* cited by examiner

Primary Examiner—Hoan H Tran
(74) Attorney, Agent, or Firm—Panitch Schwarze Belisario & Nadel LLP

(57) ABSTRACT

An image forming system includes an image producing apparatus that produces image data and an image forming apparatus that prints the image data. The image producing apparatus produces the image data, and detects from the image data usage information indicative of an amount of consumable required for printing the image data. Then, the image producing apparatus sends the usage information to the image forming apparatus. The image forming apparatus adds the usage information to an accumulated amount of consumable to update the accumulated amount of consumable. When the accumulated amount of consumable exceeds a threshold, the image forming apparatus sends to the image producing apparatus setting information that specifies the settings of the image producing apparatus such that an image is formed without an accumulated amount consumable exceeding an upper limit. The image producing apparatus performs its setting based on the setting information.

15 Claims, 16 Drawing Sheets

IMAGE FORMING APPARATUS AND IMAGE FORMING SYSTEM

BACKGROUND OF THE INVENTION

1. Field of the Invention

The present invention relates to an image forming apparatus and an image forming system.

2. Description of the Related Art

The users of some of conventional image forming apparatuses such as printers and copying machines are often restricted from using consumable items such as paper and toner. Japanese patent (KOKAI) No. 2004-98505 discloses one such apparatus. An upper limit of usage of a consumable item is assigned to each user and accumulated usage is recorded. When the accumulated usage of the consumable item reaches the upper limit, the user is prevented from using the apparatus any further.

However, it may happen that the user is advised that the accumulated usage has reached the upper limit in the middle of a printing operation, in which case, the accumulated usage must be set again before the printing operation can be resumed.

SUMMARY OF THE INVENTION

An object of the invention is to provide an image forming apparatus and an image forming system in which the accumulated usage of the apparatus will not reach its upper limit in the middle of a printing operation.

An image forming apparatus forms images based on image data received from an external device. A first storing section holds an upper limit of accumulated amount of a consumable consumed in forming images. A second storing section holds a threshold value smaller than the upper limit. An image forming section forms the image based on the image data. A totalizing section holds an accumulated amount of the consumable consumed in forming the images. When an image is formed, the totalizing section detects an amount of the consumable required in forming the image and then adds the detected amount of consumable to the accumulated amount to update the accumulated amount. A notification section outputs a remaining amount of the consumable that is available before the accumulated amount reaches the threshold value. The remaining amount is outputted when the third value exceeds the second value.

An image forming system includes an image producing apparatus that produces image data and an image forming apparatus that forms images in accordance with the image data.

The image producing apparatus includes an image data generating section, a consumable usage detecting section, a communication section, a communication section, a display section. The image data generating section produces the image data based on setting information that specifies settings such that an image is formed without an accumulated amount of a consumable exceeding an upper limit. The consumable usage detecting section detects usage information from the image data, the usage information representing an amount of the consumable that is consumed in forming the image. The communication section sends the image data and the usage information to the image forming apparatus and receives the setting information from the image forming apparatus. The display section displays the setting information received from the image forming apparatus.

The image forming apparatus includes a first storing section, a second storing section, an image forming section, a totalizing section, a totalizing section, a third storing section, a setting information calculation section, and a notification section. The first storing section holds a first value indicative of the upper limit. The second storing section holds a second value smaller than the first value. The image forming section forms the image based on the image data. The totalizing section holds a third value indicative of the accumulated amount of consumable, wherein the totalizing section detects an amount of consumable consumed in forming the image, and then adds the detected amount of consumable to the third value to update the third value. The third storing section stores consumable information and printing mode information on the image forming apparatus. The setting information calculation section that calculates the setting information based on the usage information, the first value, the second value, the third value, the consumable information, and printing mode information. The notification section notifies the image producing apparatus of the setting information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

Figure 1:
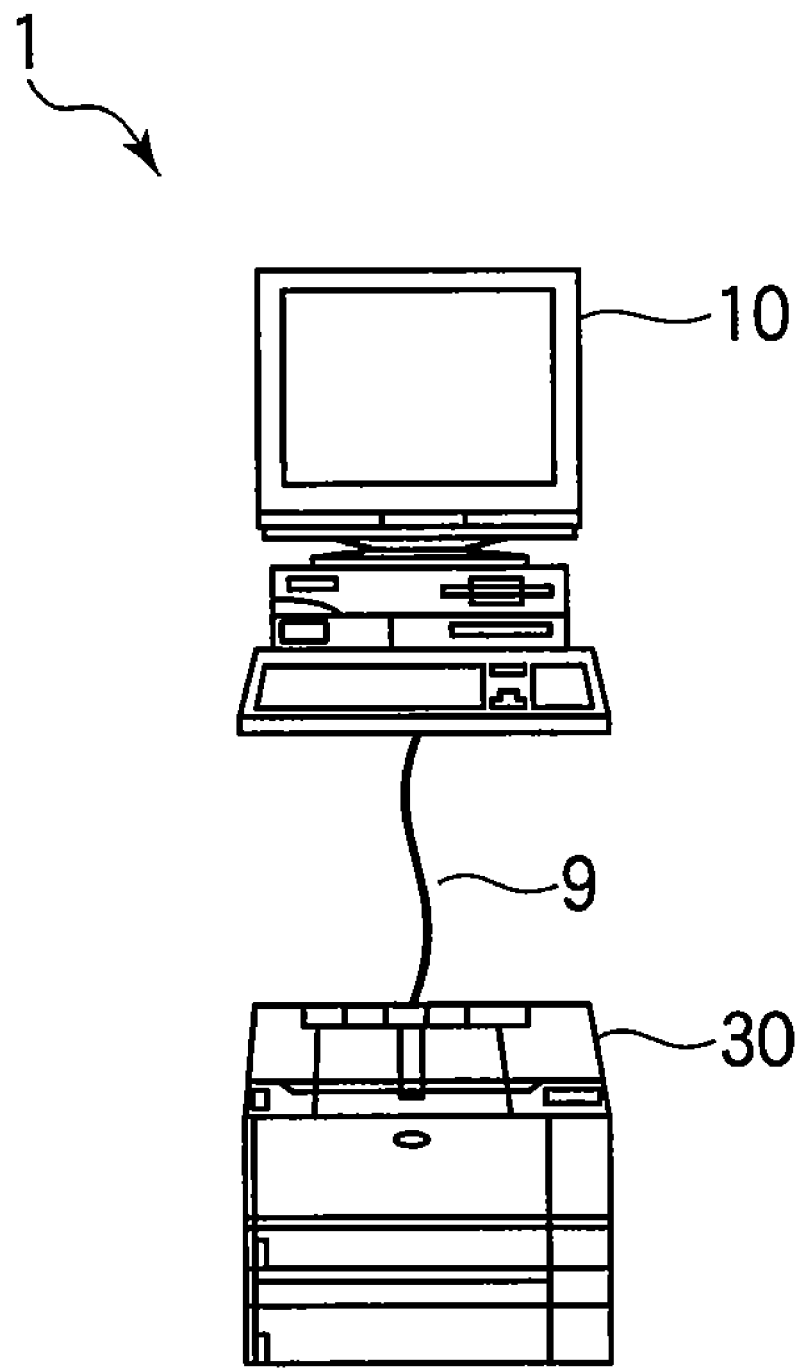
FIG. 1 is a block diagram illustrating the overall configuration of an image forming system according to a first embodiment.

FIG. 1 is a block diagram illustrating the overall configuration of an image forming system according to a first embodiment. Referring to FIG. 1, an image forming system 1 includes a computer 10 that serves as an image producing apparatus and a printer 30 that serves as an image forming apparatus. The computer 10 and printer 30 communicate with each other over a cable 9.

Figure 2:
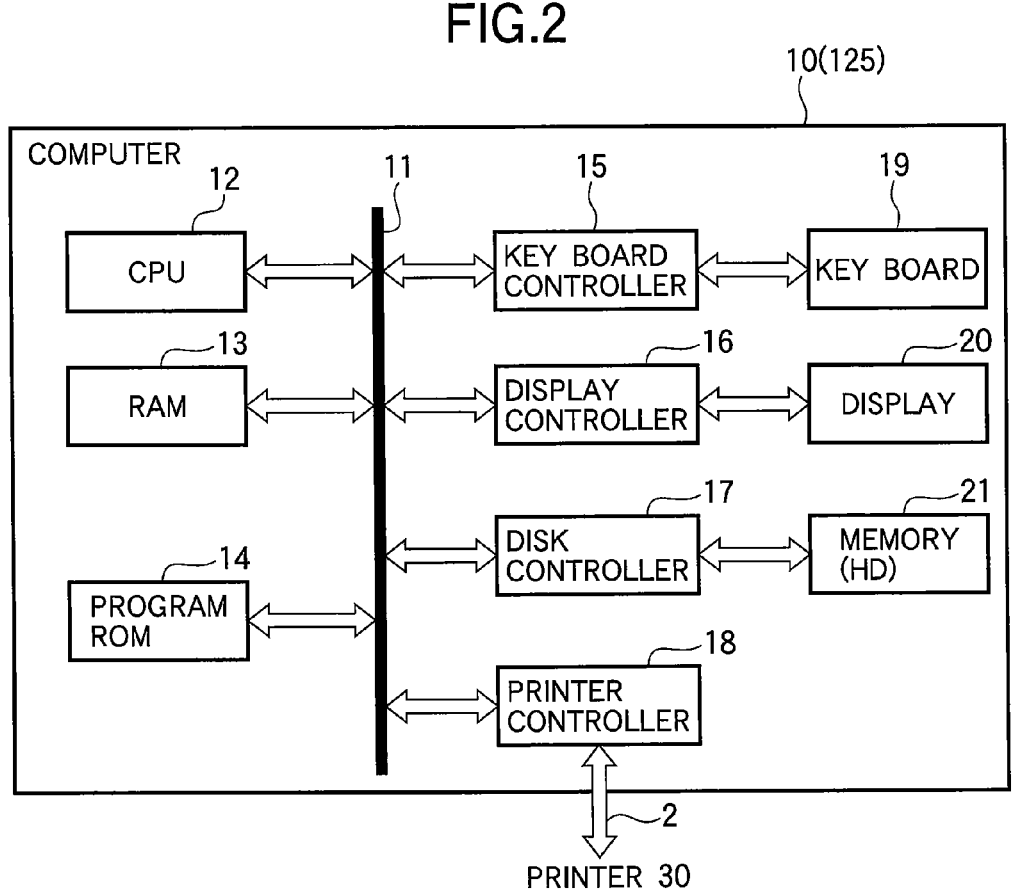
FIG. 2 is a block diagram illustrating a pertinent portion of a computer.

FIG. 2 is a block diagram illustrating a pertinent portion of the computer 10.

Referring to FIG. 2, the computer 10 includes a CPU 12, a RAM 13, a program ROM 14, a key board controller 15, a display controller 16; a disk controller 17, and a printer controller 18, which are all connected to a system bus 11. The computer 10 further includes a key board 19 connected to the key board controller 15; a display 20 connected to the display controller 16; and a memory 21 such as a hard disk connected to the disk controller 17.

The CPU 12 executes a document generation program (e.g. word processor) stored in the program ROM 14 or the memory 21 to centrally control the respective devices in order to generate a document that contains graphics, images, and characters therein. The control program executed by the CPU is stored in the program ROM 14 or the memory 21. The RAM 13 is an expandable RAM, and serves as a main memory and a work area for the CPU 12. The key board controller 15 receives information inputted through the key board 19 by an operator. The display controller 16 displays the information on a display. The disk controller 17 controls access to the memory 21 which stores various applications, user files, and programs for producing printer control commands. The printer controller 18 is connected to the printer 30 via an interface 2, and controls communications between the computer 10 and the printer 30.

Figure 3:
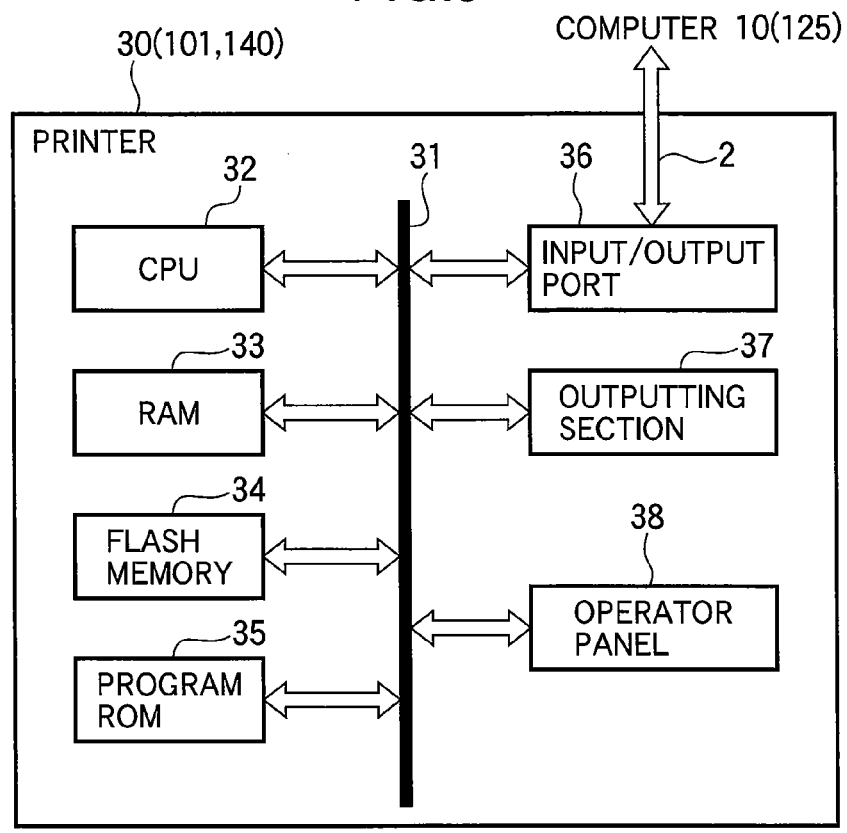
FIG. 3 is a block diagram of a pertinent portion of a printer.

FIG. 3 is a block diagram of a pertinent portion of the printer 30. The printer 30 includes a CPU 32, a RAM 33, a flash memory 34, a program ROM 35, an input/output port 36, an outputting section 37 and an operator panel 38, which are connected to a system bus 31.

Under control of the control program stored in the program ROM 35, the CPU 32 controls the respective devices connected to the system bus 31, and outputs images through the output section 37. The RAM 33 is an extendable RAM, and serves as a main memory and a work memory for the CPU 32. The flash memory 34 stores information that should be permanently stored after the printer 30 is turned off. The operator panel 38 includes switches and an LED display, not shown, for the operator to operate the printer 30. The input/output port 36 is connected to the computer 10 through an interface 2, and is controlled by the control program stored in the program ROM 35 to control communications between the computer 10 and the printer 30 in such a way that, for example, information stored within in the printer 30 is transmitted and received.

Figure 4:
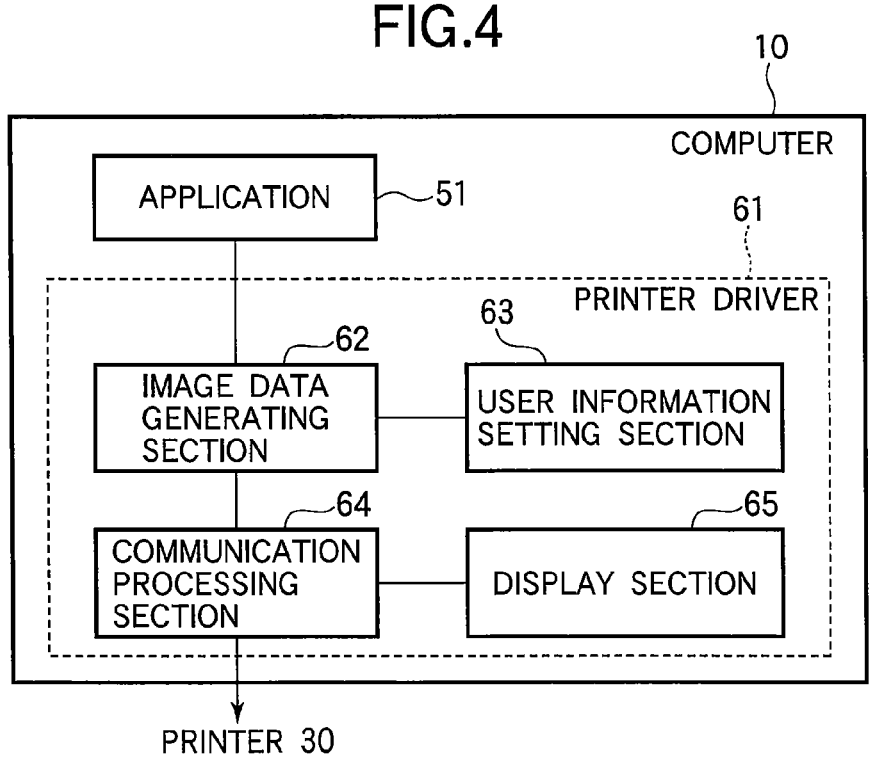
FIG. 4 is a block diagram illustrating an image forming process performed in the computer.

FIG. 4 is a block diagram illustrating an image forming process performed in the computer 10.

Referring to FIG. 4, the computer 10 includes an application 51 and a printer driver 61. The application 51 generates various instructions for producing image data. The printer driver 61 generates the image data in response to the outputs from the application 51, and communicates the image data between the computer 10 and the printer 30. The printer driver 61 includes an image data generating section 62, a user information setting section 63, a communication section 64, and a display section 65.

When a user inputs a command into the key board 19 (FIG. 2), the application 51 notifies the printer driver 61 of the initiation of outputting the application data. An instruction from the application 51 activates the user information setting section 63, which in turn reads the user information stored in the memory 21 (FIG. 2) and adds the user information to the top of the application data. After the user information setting section 63 has added the user information to the top of the application data, the image data generating section 62 is activated, and then receives the user information and the application data from the user information setting section 63. The image data generating section 62 converts various commands received from the application 51, the user information, and the application data into data to be sent to the printer, i.e., image data. The image data is then stored into the RAM 13. After the image data generating section 62 completes image data producing process, the communication section 64 is activated, and controls the printer controller 18 to send the image data stored in the RAM 13 to the printer 30 through the interface 2. When the communication section 64 receives, from the printer 30, display information such as a remaining number of sheets of recording medium such as paper that the user is allowed to print out from the printer 30, the display section 65 is activated to display the display information to the user on the display 20.

Figure 5:
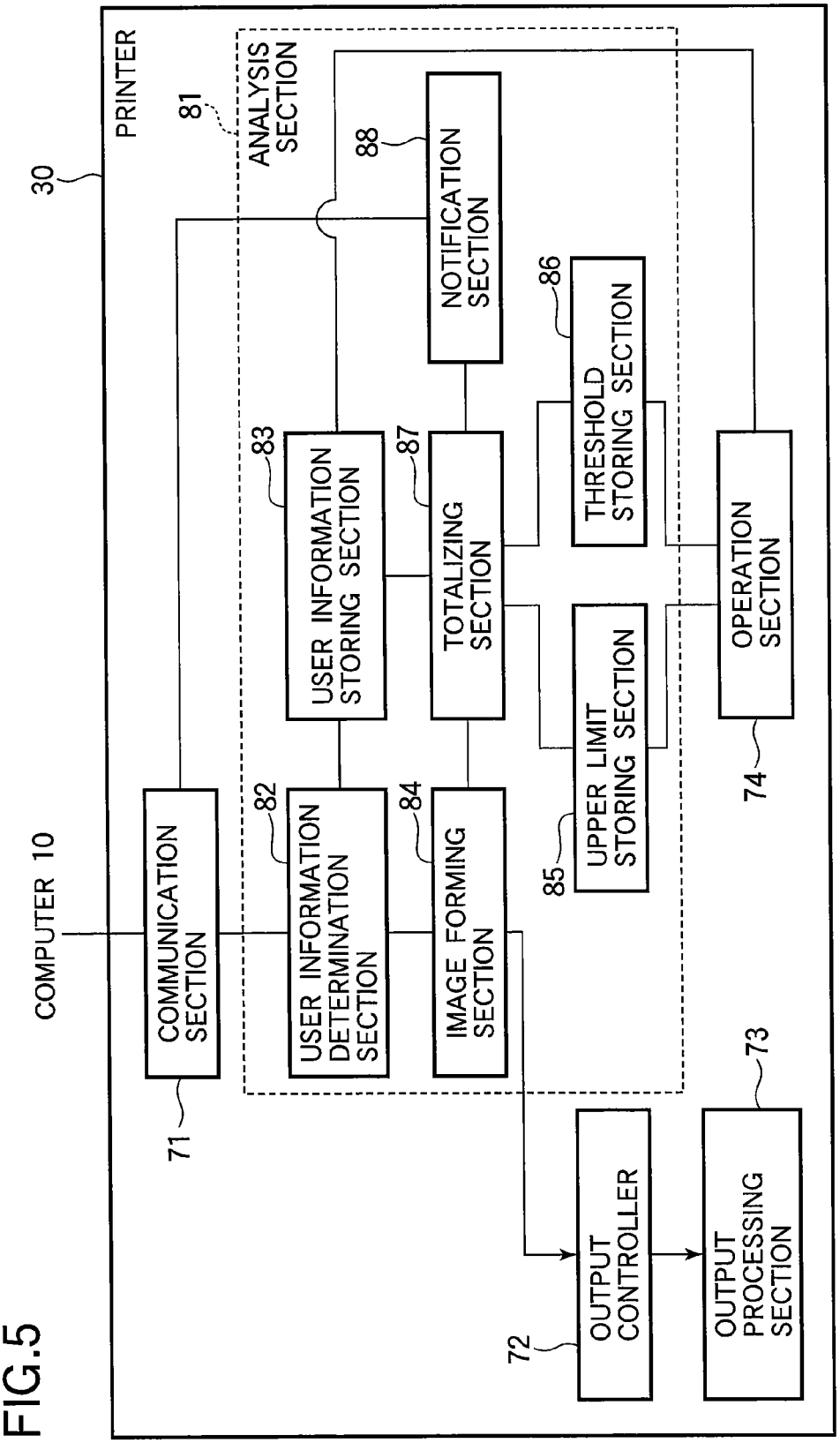
FIG. 5 is a block diagram illustrating the image forming process performed in the printer.

FIG. 5 is a block diagram illustrating the image forming process performed in the printer 30.

Referring to FIG. 5, the printer 30 includes a communication section 71, an output controller 72, an output processing section 73, an operation section 74, and an analysis section 81.

The analysis section 81 includes a user information determination section 82, a user information storing section 83, an image forming section 84, an upper limit storing section 85, a threshold storing section 86, a totalizing section 87, and a notification section 88.

When the computer 10 transmits data through the interface 2, the CPU 32 generates an interruption to activate the communication section 71, which in turn stores the data received from the computer into the RAM 33. After the data has been stored into the RAM 33, the analysis section 81 is activated to initiate data analysis. If the analysis section 81 determines that the received data should be printed out from the printer 30, the output controller 72 is activated after the analysis section 81 has completed the analysis of the data. The output controller 72 then receives the image forming data, which will be described later, from the analysis section 81, and initiates the control of the printing of the data. The output processing section 73 receives the image forming data from the output controller 72, and prints out the image forming data. The operation section 74 stores an upper limit, a threshold value, and user information, which are inputted from the operator panel 38 (FIG. 3), into the flash memory 34.

After the communication section 71 stores the data into the RAM 33, the user information determination section 82 is activated to check the user information in the data. When the user inputs the user information from the operator panel 38, the user information storing section 83 is activated, and stores the user information into the flash memory 34. Further, when the user information determination section 82 determines that the data in the RAM 33 includes the user information, the user information storing section 83 is also activated, and compares the user information stored in the flash memory 34 with the user information determined by the user information determination section 82. The upper limit storing section 85 and threshold storing section 86 store the upper limit and threshold value, respectively, into and read from the flash memory 34.

When the user information determination section 82 determines that the data in the RAM 33 is image data and the user information in the image data coincides with the user information in the flash memory 34, the image forming section 84 is activated, and converts the image data into image forming data (e.g. bit map data) and stores the bit map data into the RAM 33.

When the image forming section 84 completes production of the image forming data, the totalizing section 87 is activated to extract the number of sheets of the paper on which the image forming data is going to be printed, adds the extracted number of sheets to the number of sheets read from the flash memory 34, and holds their sum. Then, the totalizing section 87 compares the sum with a threshold value read from the flash memory 34. When the sum is greater than the threshold value, the notification section 88 controls the communication section 71 so that the communication section 71 sends the remaining number of sheet available for printing to the computer 10. Instead of the remaining number of sheets, the computer 10 may also be notified of both the upper limit and the sum. The remaining number of sheets is also calculated in the totalizing section 87.

The image forming system 1 of the aforementioned configuration will be described with reference to FIGS. 6, 7, and 8.

Figure 6:
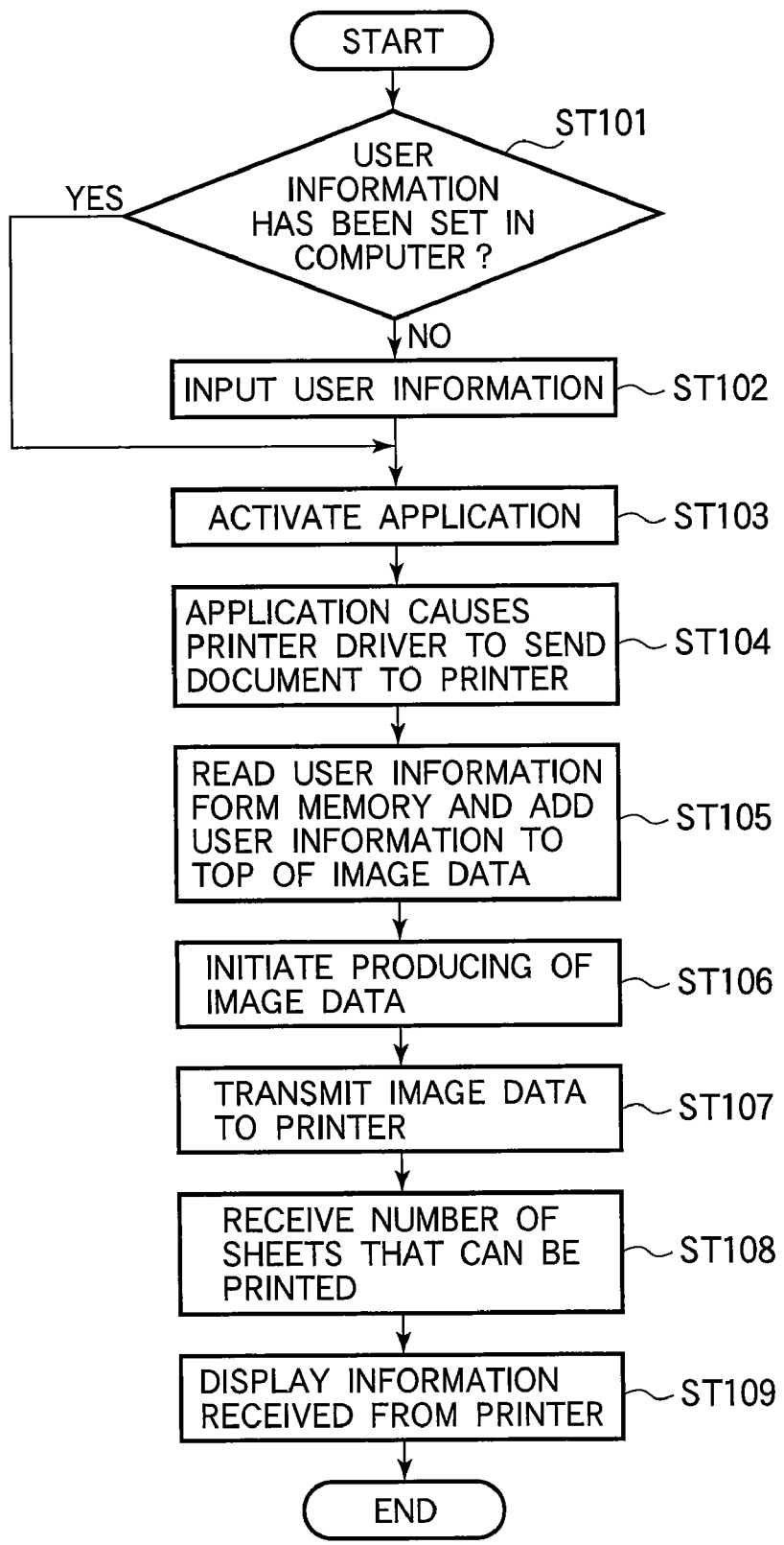
FIG. 6 is a flowchart illustrating the operation of the computer.

FIG. 6 is a flowchart illustrating the operation of the computer 10. The operation of the computer 10 will be described with reference to FIGS. 2, 4 and 6.

The user makes a decision to determine whether his user information has been set in the computer 10 (step S101). If the answer is NO, then the user inputs his user information from the key board 19, the user information being stored into the memory 21 (step S102). Then, the user operates the key board to activate the application 51 (step S103). In order to print the application data such as a document, the application 51 then causes the printer driver 61 to send the image data to the printer 30 (step S104).

When the printer driver 61 initiates outputting of the data to the printer 30, the print driver 61 activates the user information setting section 63, which in turn reads the user information from the memory 21 and adds the user information to the top of the application data (step S105). The printer driver 61 activates image data generating section 62, which in turn initiates producing of image data (step S106). The printer driver 61 further activates the communication section 64 which in turn transmits the image data to the printer 30 (step S107). Prior to producing the image data that should be transmitted to the printer 30 is produced, the printer driver 61 produces image data in accordance with printing conditions e.g., various settings such as duplex printing, which are previously set.

Then, the printer driver 61 receives display information from the printer 30. This information represents the number of sheets that can be printed out from the printer 30 (step S108). The printer driver 61 activates the display section 65 so that the display information is displayed to the user on the display 20 (step S109).

Figure 7:
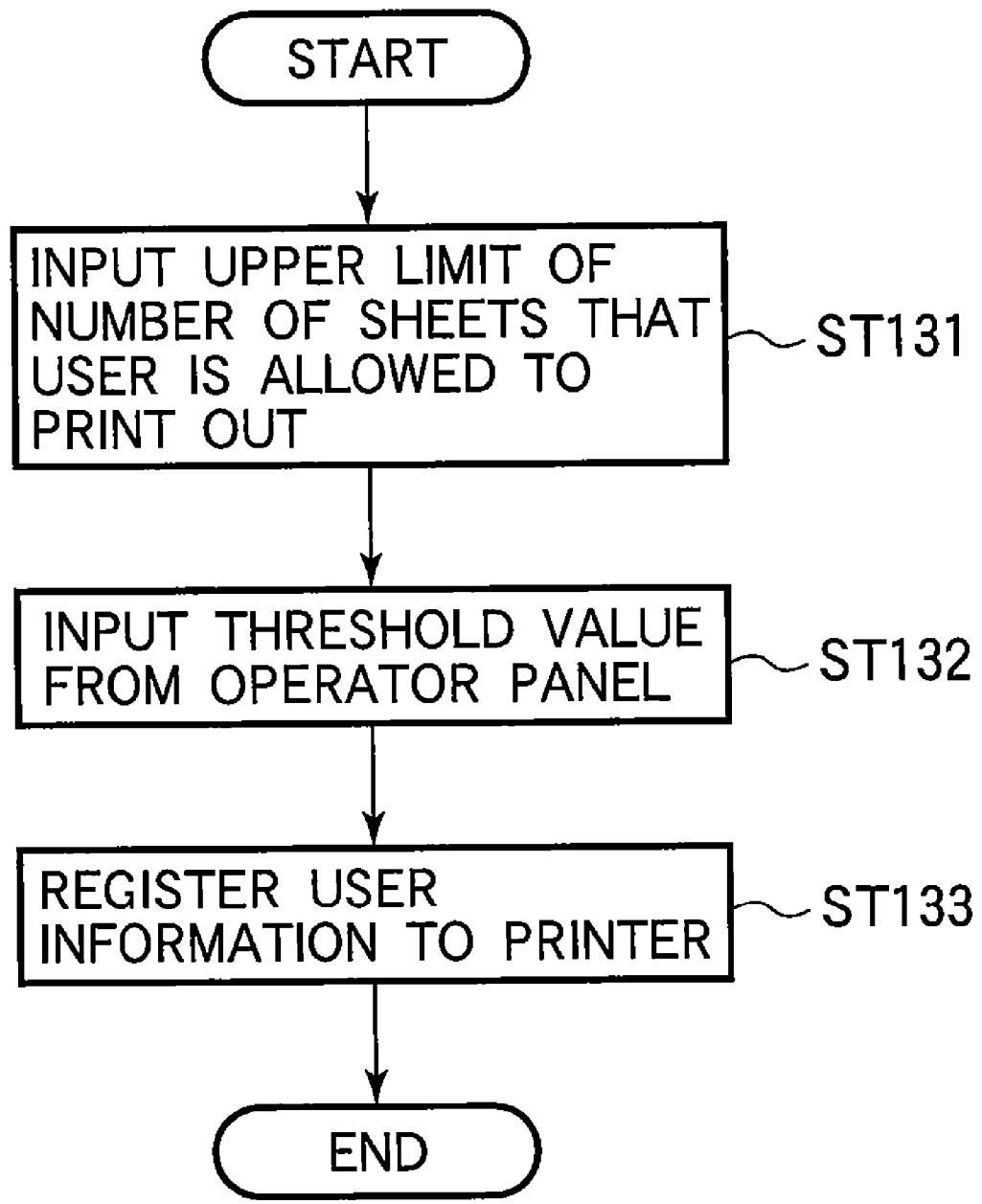
FIG. 7 is a flowchart illustrating the operation of the printer.

FIG. 7 is a flowchart illustrating the operation of the printer 30.

A description will be given of the operation in which an upper limit, a threshold, and user information are set to the printer 30. The description will be given with reference to FIG. 3 and FIG. 7.

The administrator of the printer 30 operates the operator panel 38 to input a numeral "1000," which means that a total of 1000 sheets is an upper limit of the number of sheets that a user is allowed to print out (step S131). The administrator also operates the operator panel 38 to input a numeral "800," into the printer 30, the numeral "800" indicating a threshold value (step S132). The threshold value is an accumulated number of sheets that the user used previously, and warns the user that the remaining number of sheets that the user is allowed to print out from the printer 30 is low. The administrator further operates the operator panel 38 to register the user information to the printer 30, the user information indicating a user who is allowed to output a printed document from the printer 30 (step S133).

The upper limit, threshold value, and user information may also be stored into the printer 30 through the computer 10 and interface 2.

Figure 8:
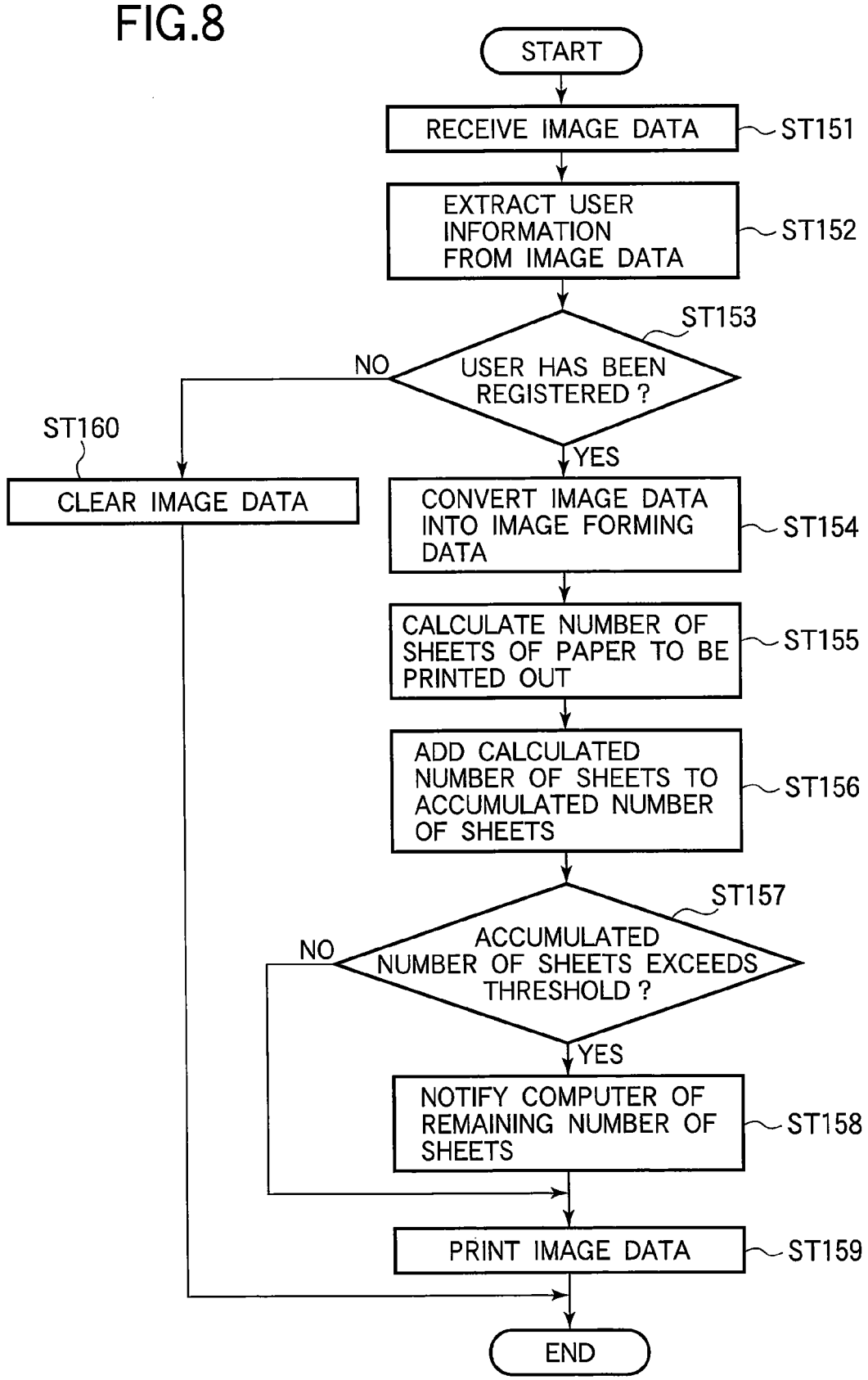
FIG. 8 is another flowchart illustrating the operation of the printer.

FIG. 8 is another flowchart illustrating the operation of the printer 30. A description will be given of the operation of the printer 30 with reference to FIGS. 3, 5, and 8.

The communication section 71 is activated so that the printer 30 receives the image data from the computer 10 through the interface 2 (step S151). The user information determination section 82 is activated to extract the user information from the received image data (step S152). Then, the user information storing section 83 is activated, and makes a decision to determine whether a user who sent the image data is a user who has been registered in the printer 30 (step S153). If the answer is NO, then the received image data is cleared (step S160), and then the program ends with no document outputted.

If the answer is YES, the image forming section 84 is activated, and converts the received image data into image forming data (e.g. bit map data) (step S154). Then, the totalizing section 87 is activated, and calculates the number of sheets of recording paper to be printed out (step S155). Then, the totalizing section 87 adds the calculated number of sheets to the accumulated number of sheets that the user has used previously (step S156). In this manner, the accumulated number of sheets is updated and managed on a user-by-user basis.

The totalizing section 87 makes a decision to determine whether the accumulated number of sheets for the user has exceeded the threshold value stored in the threshold storing section 86 (step S157). If the answer is YES, the notification section 88 is activated, and notifies the computer 10 of the remaining number of sheets that the user is allowed to print out from the printer 30 (step S158), and then the image forming data is printed out (step S159). If the answer is NO at step S157, the program proceeds to step S159.

Referring to FIG. 6, the computer 10 indicates the remaining number of sheets, i.e., the number of pages available for the next printing operation to the user immediately after having transmitted the image data to the printer 30. However, the invention is not limited to this. For example, the remaining number of sheets may be stored so that the remaining number of sheets is displayed to the user prior to the next printing operation.

The flowchart in FIG. 8 makes no mention of an operation when the accumulated number of sheets has reached the upper limit (e.g. 1000). The operation may be configured as follows: For example, a step for comparing the accumulated number of sheets with the upper limit may be provided before step S159. Then, if the accumulated number of sheets is not more than the upper limit, the program proceeds to step S159. If the total accumulated number of sheets is more than the upper limit, the program proceeds to step S160 where the data received from the computer is cleared and the operation ends.

As described above, a threshold value less than the upper limit is set for a user. When the accumulated number of sheets has reached the threshold value, the printer indicates to the user the remaining number of sheets that the user is allowed to print out from the printer. Thus, the user knows that the remaining number of sheets is low. More specifically, the user knows how many more pages he can print.

Second Embodiment

Figure 9:
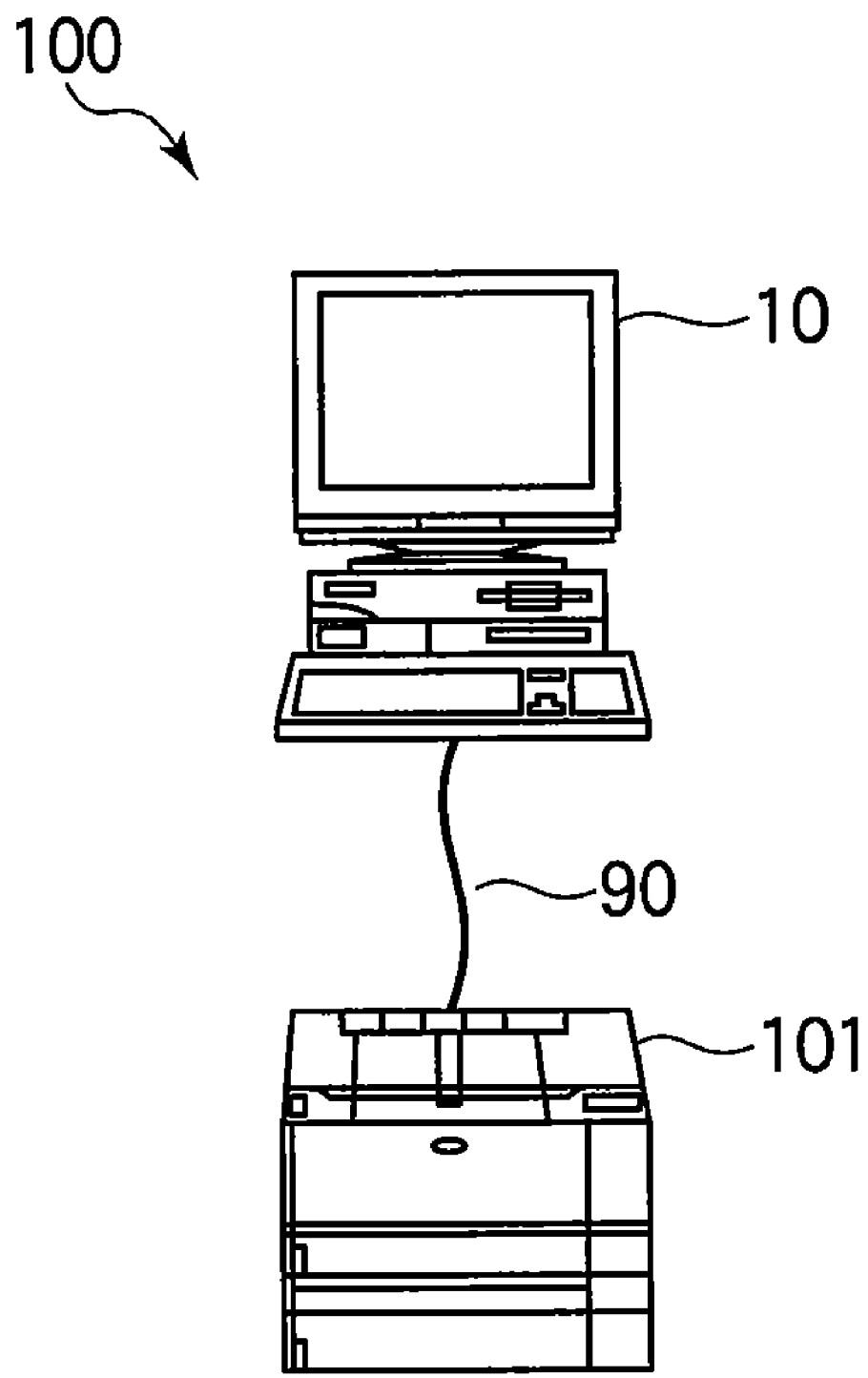
FIG. 9 is a perspective view illustrating the overall configuration of an image forming system according to a second embodiment.

FIG. 9 is a perspective view illustrating the overall configuration of an image forming system according to a second embodiment. Referring to FIG. 9, an image forming system 100 includes a computer 10 that serves as an image producing apparatus and a printer 101 that serves as an image forming apparatus. The computer 10 and the printer 101 communicate with each other over a cable 90.

The computer 10 according to the second embodiment is the same as that in the first embodiment, and its description is omitted.

Figure 10:
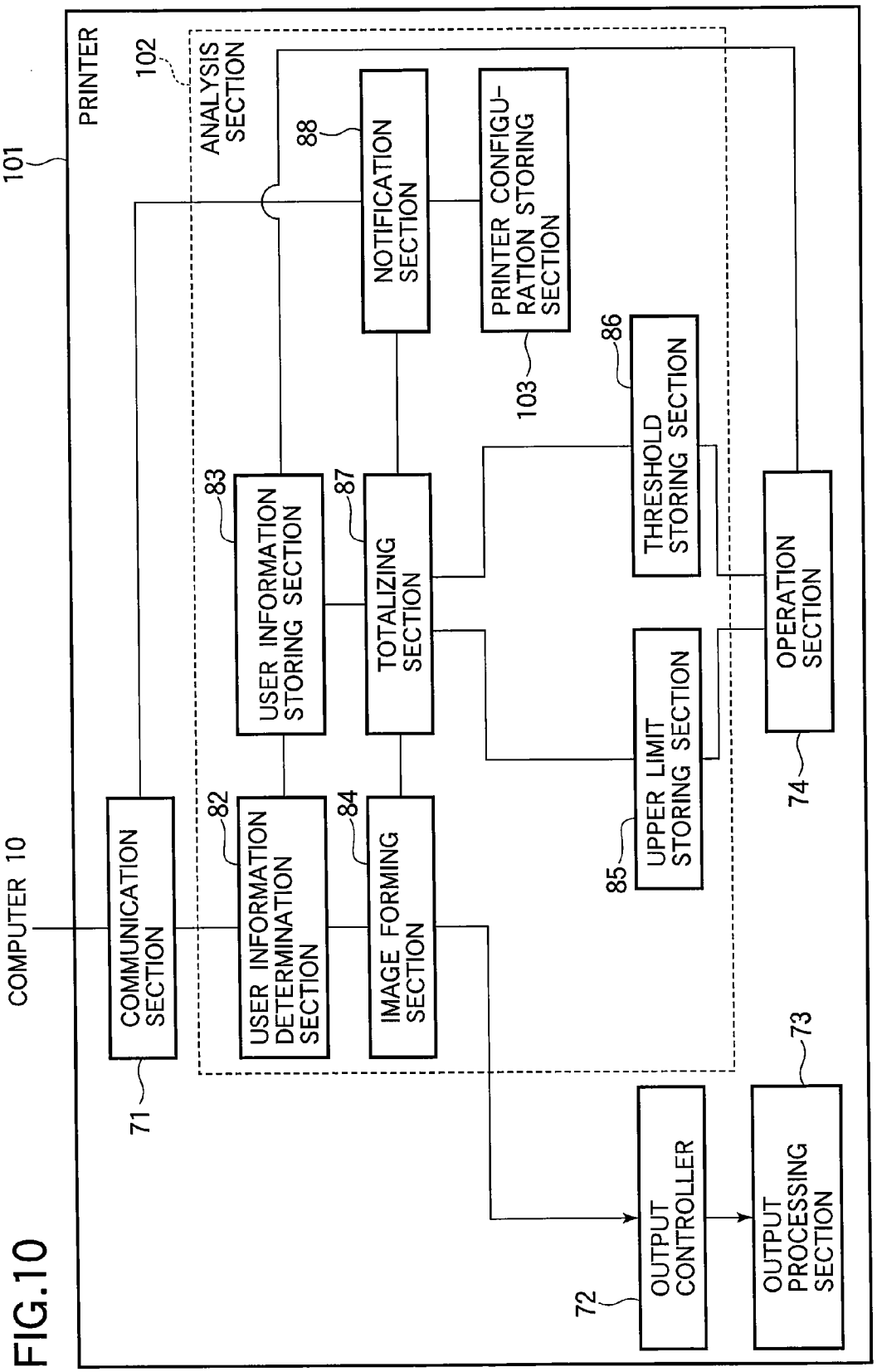
FIG. 10 is a block diagram illustrating an image forming process performed by the printer.

FIG. 10 is a block diagram illustrating an image forming process performed by the printer 101.

The block diagram in FIG. 10 differs from the block diagram in FIG. 5 in that a printer configuration storing section 103 is additionally provided.

Elements similar to those in the first embodiment have been given the same reference numerals and the description is omitted. A description will be given of those different from the first embodiment.

Referring to FIG. 10, the printer 101 includes a communication section 71, an output controller 72, an output processing section 73, an operation section 74, and an analysis section 102.

The analysis section 102 includes a user information determination section 82, a user information storing section 83, an image forming section 84, an upper limit storing section 85, a threshold storing section 86, a totalizing section 87, a notification section 88, and a printer configuration storing section 103.

The respective sections are the same as those in the first embodiment except for the printer configuration storing section 103.

When the printer 101 is turned on, the printer configuration storing section 103 detects the presence or absence of a duplex printing unit, the size of paper in the respective trays, and the types of paper in the respective trays. The printer configuration storing section 103 stores these items of information (referred to as printer configuration information hereafter) into the flash memory 34. When the operator operates the tray to slide in and out, the printer configuration storing section 103 also stores the size and type of paper in that tray into flash memory 34. When the accumulated number of sheets assigned to a user exceeds a threshold value, the printer configuration storing section 103 reads the printer configuration information such as the presence or absence of a duplex printing unit, the size of paper in the respective trays, and types of paper in the respective trays, from the flash memory 34. Then, the printer configuration storing section 103 sends the printer configuration information read from the flash memory 34 to the notification section 88.

The operation of the image forming system 100 of the aforementioned configuration will be described with reference to FIG. 11.

The administrator of the printer 101 sets an upper limit, a threshold, and user information into the printer 101. This setting is performed according to the flowchart in FIG. 7. The administrator operates the operator panel 38 to set "1000" for the upper limit of the number of sheets that a user is allowed to print out from the printer 101, and "800" for the threshold value at which the user is warned that the remaining number of sheets assigned to the user is low. Further, the administrator operates the operator panel 38 to input user information, thereby registering the user to the printer 101.

Figure 11:
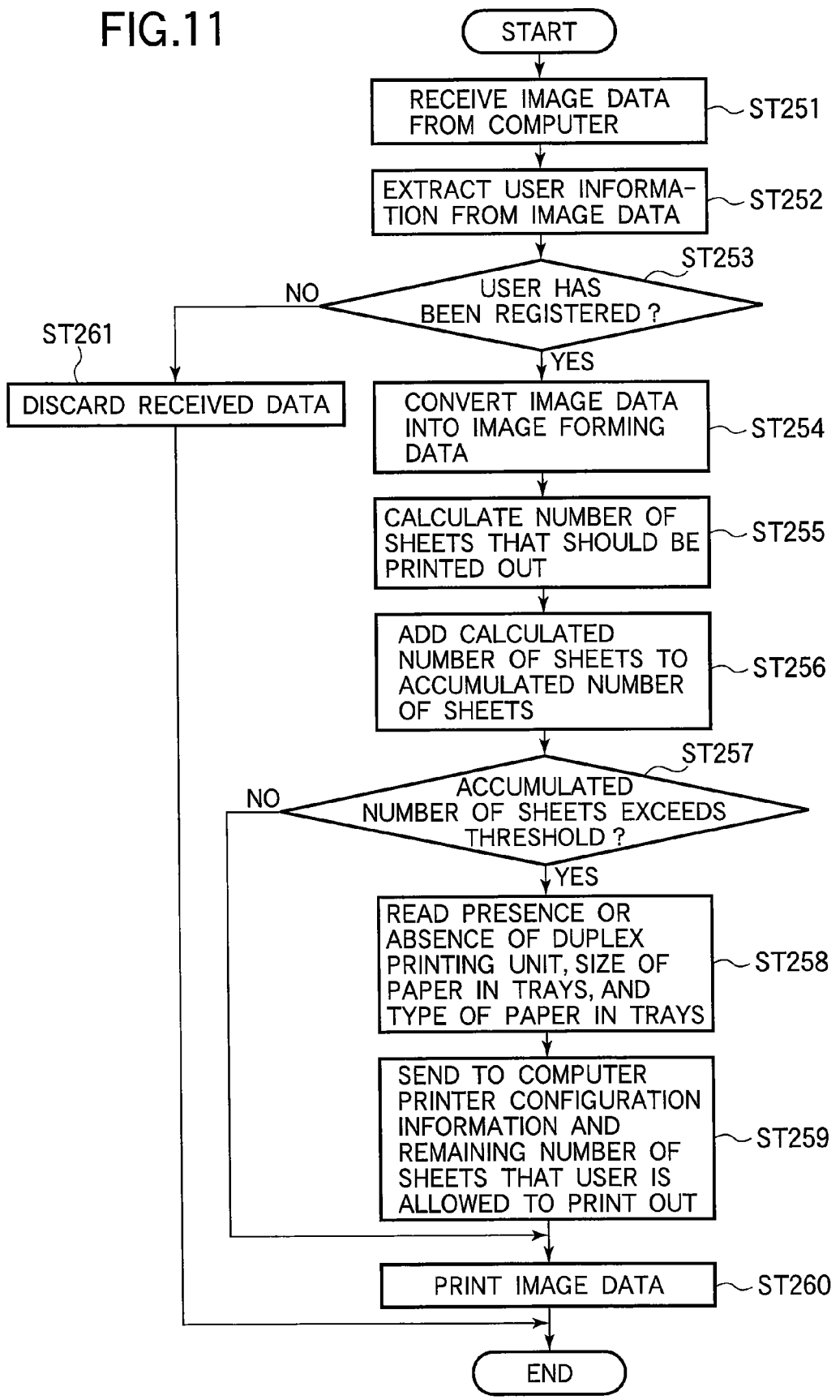
FIG. 11 is a flowchart illustrating the operation of the printer.

FIG. 11 is a flowchart illustrating the operation of the printer 101. The operation of the printer 101 will be described with reference to FIGS. 3, 10, and 11.

First, the communication section 71 is activated and receives the image data that contains number-of-sheets information and user information from the computer 125 through the interface 2 (step S251). The user information determination section 82 is activated and extracts the user information from the image data received at step S251, thereby identifying the user (step S252). The user information storing section 83 is activated and checks the extracted user information to determine whether the user has been registered in the printer 101 (step S253). If the answer is NO, the received data is discarded (step S261) and the program ends.

If the answer is YES at step S253, the image forming section 84 is activated and converts the received image data into image forming data (e.g. bit map data) (step S254). The totalizing section 87 is activated, calculates from the image forming data the number of sheets that should be printed (step S255), and adds the calculated number of sheets to the accumulated number of sheets for that user, thereby updating the accumulated number of sheets (step S256). In this manner, the accumulated number of sheets is calculated and managed on a user-by-user basis.

Then, the totalizing section 87 checks whether the accumulated number of sheets for that user has exceeded the threshold value stored in the threshold storing section 86 (step S257). If the answer is YES, the printer configuration storing section 103 is activated, reads the printer configuration information such as the presence or absence of the duplex printing unit, the size of paper in the respective trays, and the type of paper in the respective trays, from the flash memory 34. Then, the printer configuration storing section 103 sends these items of information to the notification section 88 (step S258). For example, the printer configuration information represents that the duplex printing unit has not been attached to the printer 101, and that only tray 1 is attached to the printer 101 and holds A4 size paper that can be printed on its both sides.

The notification section 88 notifies the computer 10 of printer configuration information received from the printer configuration storing section 103 and remaining number of sheets that the user is allowed to print (step S259). The printer configuration information and remaining number of sheets are displayed on the display 20 of the computer 10 so that the user knows whether the next printing operation can be performed without exceeding the upper limit.

The printer configuration information and remaining number of sheets may also be displayed again to the user prior to the next printing operation.

Printing may be performed in various printing modes. For example, when the remaining number of sheets that the user is allowed to print is "1" and the user attempts to print 2 pages in a duplex printing mode, the printer 101 is unable to print if the duplex printing unit has not been attached to the printer 101. However, if the printer 101 is capable of performing compressed printing, for example, in a 2UP mode where image data for two pages is reduced to fit one page and is printed on one page, printing may be possible. Thus, when the remaining number of sheets that the user is allowed to print is only "1" and the user attempts to print 2 pages in the duplex printing mode, the printer 101 may make a decision whether the image data can be printed in the 2UP mode so that the accumulated number of sheets is within the upper limit for that user.

After the notification section 88 notifies the computer 10 of the printer configuration information and remaining number of sheets, the image forming data is printed out (step S260). If the answer is NO at step S257, the program proceeds to step S260 where the image forming data is printed.

While the flowchart in FIG. 11 does not address the operation when the accumulated number of sheets reaches the upper limit (e.g. 1000), a step in which the accumulated number of sheets is compared with the upper limit may be inserted before step S260. If the accumulated number of sheets is not more than the upper limit, the program proceeds to step S260 where printing is performed until the accumulated number of sheets reaches the upper limit. If the accumulated number of sheets is more than the upper limit, the program proceeds to step S261 where the received data is discarded and printing is terminated.

As described above, because the user is notified of the printer configuration information and remaining number of sheets, the user is prevented from printing pages more than the upper limit.

The second embodiment has been described in terms of the amount of paper usage. Alternatively, the amount of consumable usage may be the amount of toner usage instead of the amount of paper usage, in which case, the printer 101 may be configured as follows: That is, the flash memory 34 stores various information items and their settings. The printer configuration storing section 103 reads these items of information from the flash memory 34, and outputs them to the notification section 88. The various information items include, for example, whether the printer 101 is provided with a toner saving mode and whether the resolution of the printed image may be set stepwise.

Third Embodiment

Figure 12:
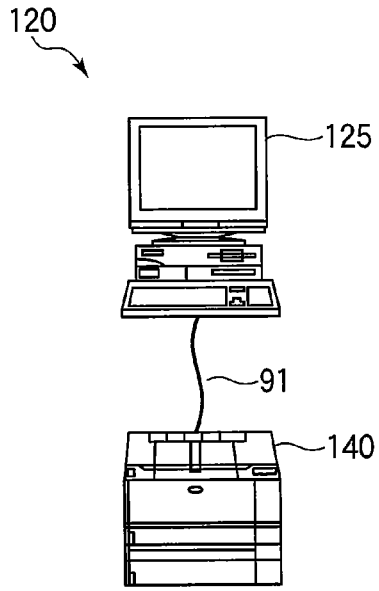
FIG. 12 is a perspective view illustrating the overall configuration of an image forming system according to a third embodiment.

FIG. 12 is a perspective view illustrating the overall configuration of an image forming system according to a third embodiment. Referring to FIG. 12, an image forming system 120 includes a computer 125 that serves as an image producing apparatus and a printer 140 that serves as an image forming apparatus. The computer 125 and printer 140 communicate with each other via a cable 91.

Figure 13:
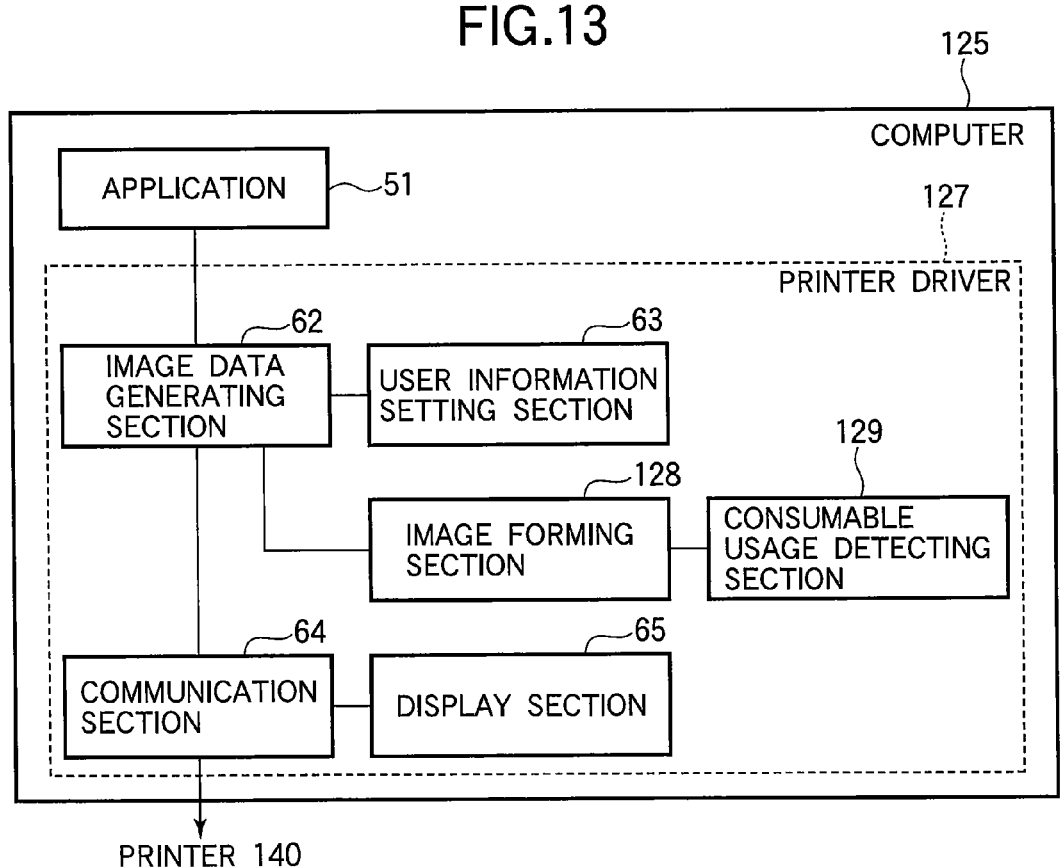
FIG. 13 is a block diagram illustrating the image forming process performed in the computer.

FIG. 13 is a block diagram illustrating the image forming process performed in the computer 125.

The block diagram in FIG. 13 differs from that in FIG. 4 in that an image forming section 128 and a consumable usage detecting section 129 are additionally used. Elements similar to those in the first embodiment have been given the same reference numerals and their description is omitted. A description will be given of those different from the first embodiment.

Referring to FIG. 13, the computer 125 includes an application 51 and a printer driver 127. The application 51 outputs various instructions for producing image data. In response to an instruction from the application 51, the printer driver 127 produces image data, and communicates with a printer 30. The printer driver 127 includes an image data generating section 62, a user information setting section 63, a communication section 64, a display section 65, the image forming section 128, and the consumable usage detecting section 129.

The respective sections are the same as those in the first embodiment except for the image forming section 128 and the consumable usage detecting section 129. The image forming section 128 converts the image data produced by the image data generating section 62 into image forming data (e.g. bit map data). From the image forming data produced by the image forming section 128, the consumable usage detecting section 129 calculates the number of sheets that should be printed. As will be described later, the printer driver 127 produces the image data in accordance with setting information received from the printer 140.

Figure 14:
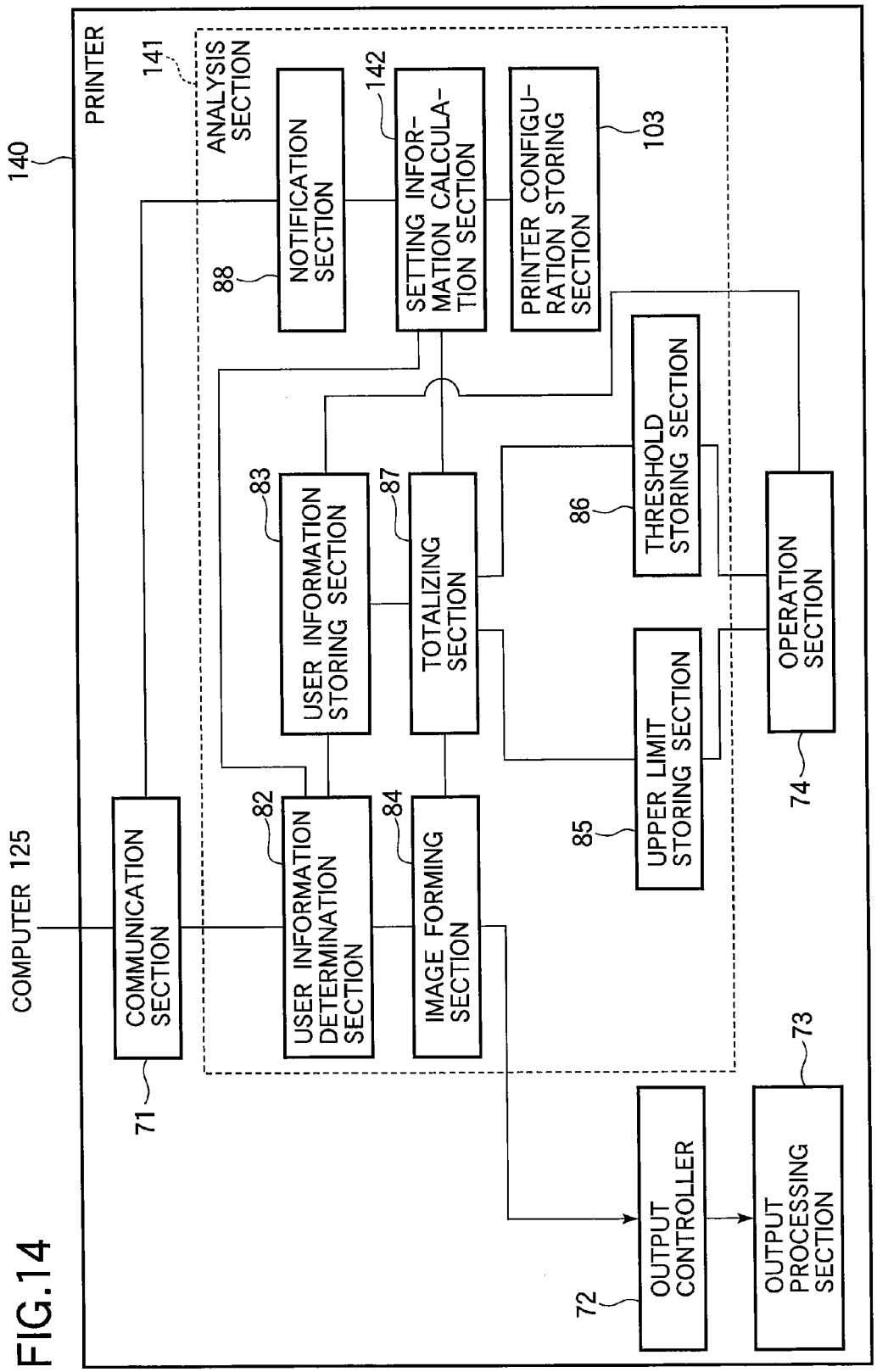
FIG. 14 is a block diagram illustrating the image forming process performed in the printer.

FIG. 14 is a block diagram illustrating the image forming process performed in the printer 140.

The block diagram in FIG. 14 differs from that in first embodiment (FIG. 5) in that a setting information calculation section 142 and a printer configuration storing section 103 are additionally used. Elements similar to those in the first embodiment have been given the same reference numerals and their description is omitted. A description will be given of those different from the first embodiment.

Referring to FIG. 14, the printer 140 includes a communication section 71, an output controller 72, an output processing section 73, an operation section 74, and an analysis section 141.

The analysis section 141 includes a user information determination section 82, a user information storing section 83, an image forming section 84, an upper limit storing section 85, a threshold storing section 86, a totalizing section 87, a notification section 88, a printer configuration storing section 103, and a setting information calculation section 142.

The respective sections are substantially the same as those in the first embodiment except for the printer configuration storing section 103 and setting information calculation section 142. Additionally, the printer configuration storing section 103 is substantially the same as that in the printer 101 in the second embodiment.

When the printer 140 is turned on, the printer configuration storing section 103 detects the presence or absence of a duplex printing unit, the size of paper in the respective trays, and the types of paper in the respective trays. The printer configuration storing section 103 stores these items of information (referred to as printer configuration information hereafter) into the flash memory 34.

The setting information calculation section 142 determines whether the image data received from the computer 125 can be printed out without the accumulated number of sheets exceeding an upper limit assigned to the user.

If the number of sheets that the user is going to print is not more than the upper limit, then the setting information calculation section 142 produces setting information, based on which the computer 125 can set settings for outputting the image data to the printer 140 before sending the image data to the printer 140. The settings for outputting the image data represent various printing conditions such as duplex printing.

The setting information is produced based on the printer configuration information stored in the printer configuration storing section 103; the number of sheets that the user is allowed to print, obtained from the flash memory 34 or the totalizing section 87; and the number of sheets that the user is going to print this time.

The setting information is sent to the computer 125 via the notification section 88 and communication section 71.

The operation of the image forming system 120 of the aforementioned configuration will be described with reference to FIGS. 15 and 16.

Figure 15:
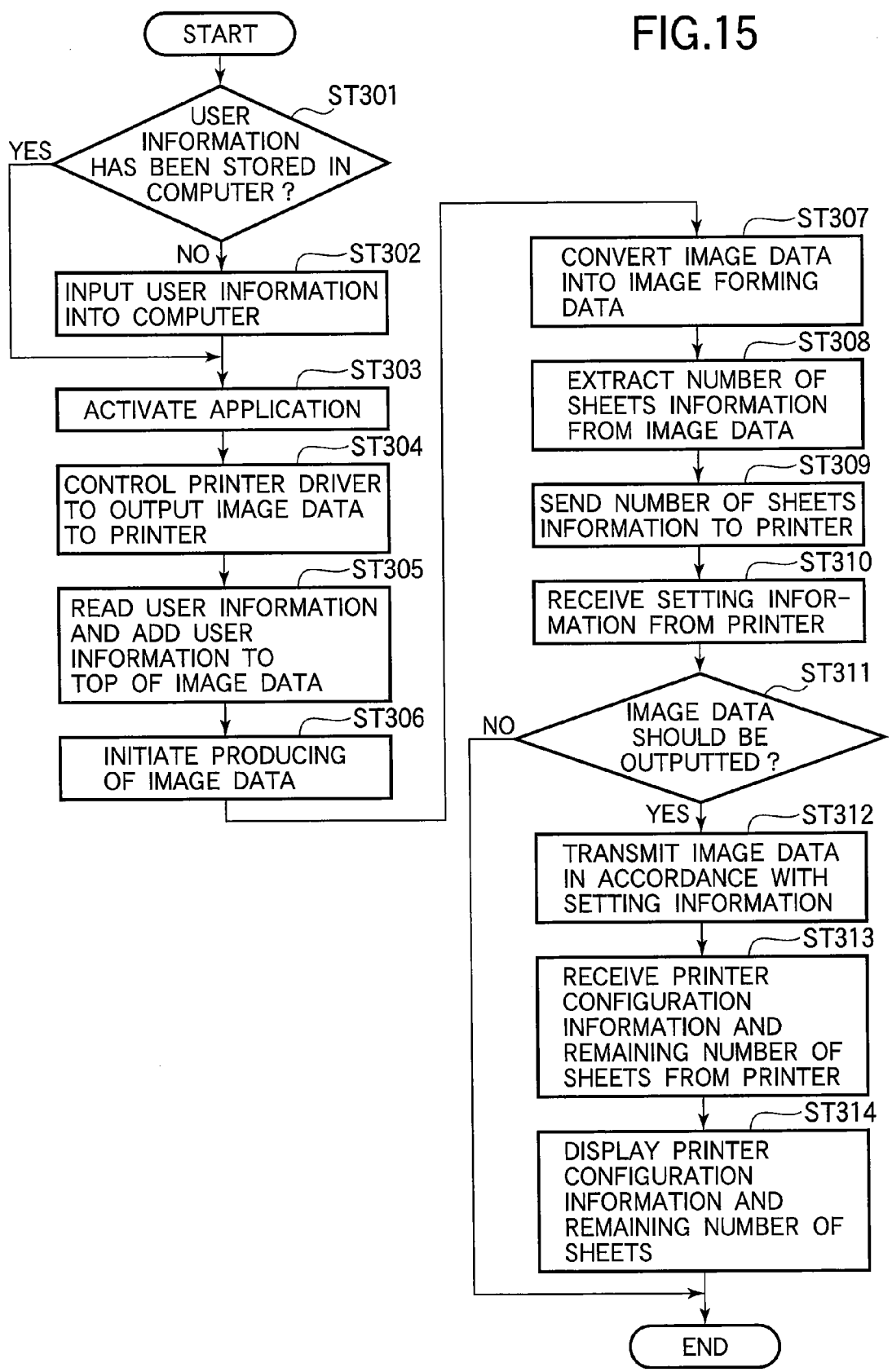
FIG. 15 is a flowchart illustrating the operation of the computer.

FIG. 15 is a flowchart illustrating the operation of the computer 125. The operation of the computer 125 will be described with reference to FIG. 15.

The user first checks whether his user information has been stored in the computer 125 (step S301). If the answer is NO, the user operates the key board 19 (FIG. 2) to input his user information into the memory 21 of the computer 125 (step S302). Then, the user operates the key board 19 to activate the application 51 (step S303). In order to print the application data such as a document, the application 51 controls the printer driver 127 to output image data to the printer 140 (step S304).

Prior to outputting the image data to the printer 140, the user information setting section 63 is activated and reads the user information from the memory 21 and adds the user information to the top of the application data (step S305). Then, the image data generating section 62 is activated and initiates producing of image data (step S306). The image forming section 128 is activates and converts the image data produced by the image data generating section 62 into image forming data (bit map data) (step S307). The consumable usage detecting section 129 is activated and extracts number-of-sheets information (i.e. the number of sheets required for the printer 140 to print the image data) from the image forming data (step S308). The number-of-sheets information is sent to the printer 140 (step S309).

Then, the computer 125 receives the setting information from the printer 140, the setting information having been produced by the printer 140 based on the number-of-sheets information outputted from the computer 125 and other information (step S310). The setting information is to specify various settings, including duplex printing, such that the printer 140 can print out the image data without the accumulated number of sheets exceeding the upper limit.

The printer driver 127 displays the received setting information for the user to decide whether the image data should be outputted in response to the received setting information (step S311). If the answer is NO, the program ends. The image data is not outputted if the computer 125 is unable to output the image data in accordance with the setting information, for example, due to the fact that the specified reduction ratio is too large.

If the answer is YES at step S311, then the printer driver 127 produces the image data in accordance with the setting information received from the printer 140, and then transmits the image data to the printer 140 (S312). Then, the printer driver 127 receives the printer configuration information and remaining number of sheets from the printer 140 (step S313). Then, the display section 65 is activated and displays the received printer configuration information and remaining number of sheets to the user on the display 20 (step S314).

The operation of the printer 140 will be described.

The administrator of the printer 140 sets an upper limit, a threshold, and user information into the printer 140 in the same procedure as the flowchart in FIG. 7. In other words, the administrator operates the operator panel 38 to input a numeral "1000," which means that a total of 1000 sheets is an upper limit of the number of sheets that the user is allowed to print. The user also inputs a numeral "800" through the operator panel 38, the numeral "800" indicating a threshold value at which the user is warned that the remaining number of sheets assigned to the user is low. The administrator further operates the operator panel 38 to register the user information into the printer 140, the user information indicative of a user to which the printer 140 is allowed to output a printed document from the printer 140.

Figure 16:
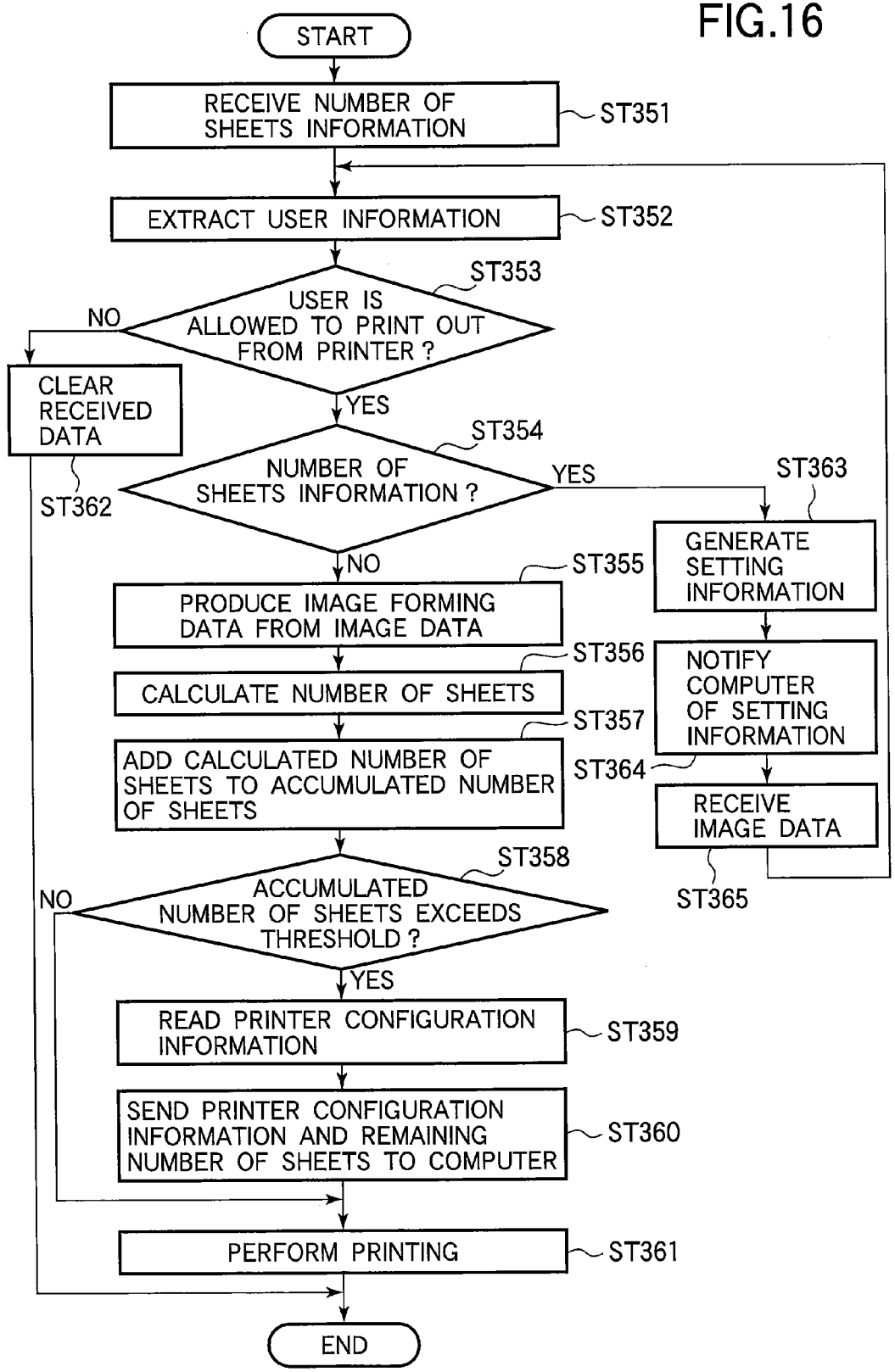
FIG. 16 is a flowchart illustrating the operation of the printer.

FIG. 16 is a flowchart illustrating the operation of the printer 140. The operation of the printer 140 will be described with reference to FIGS. 3, 14, and 16.

The communication section 71 is activated to receive the data (i.e. the image data or number-of-sheets information) from the computer 125 through the interface 2. It is to be noted that the image data and the number-of-sheets information contains the user information, respectively. The computer first transmits the number of sheets information and the communication section 71 receives the number of sheets information (step S351). The user information determination section 82 is activated and extracts the user information from the number-of-sheets information received at step 365 or the image data received at step S351 or (step S352). Then, the user information storing section 83 is activated and checks the extracted user information to determine whether the user is allowed to print out from the printer 140 (step S353). If the user is not allowed to output from the printer 140, the received data is cleared (step S362), and then the program ends.

Then, the user information determination section 82 is again activated and determines whether the data received from the computer 125 is image data or the number-of-sheets information (step S354). If the received data is the number-of-sheets information, the setting information calculation section 142 is activated, and generates setting information for the computer 125 to set the settings for outputting the image data to the printer, i.e., various printing conditions including duplex printing (step S363), and notifies the computer 125 of the setting information (step S364). Then, the program proceeds to step S365 where the communication section 71 receives image data from the computer 125 and loops back to step S352.

The process at step S363 will be described in more detail. At step S363, the setting information calculation section 142 is activated. Then, the setting information calculation section 142 generates the setting information such that printing can be performed without exceeding the upper limit of the number of sheets.

The setting information is generated based on the number-of-sheets information received at the user information determination section 82 from the computer 125; the upper limit stored in the flash memory 34; the accumulated number of sheets calculated by the totalizing section 87; and the presence or absence of the duplex printing unit and the types of paper in the paper trays, stored in the printer configuration storing section 103.

Assume that (1) the number-of-sheets information received from the computer 125 represents that "a document of 20 pages in A4 size"; (2) the upper limit is 100 pages, (3) the accumulated number of sheets is 95 pages; (4) a duplex printing unit has been loaded into the printer 140; and (5) only tray 1 is attached to the printer 140 and holds A4 size paper on which duplex printing can be performed.

In this example, the remaining number of sheets that the user is allowed to print is 5 pages, and the number of sheets required is 20. Thus, if normal printing is to be performed, the paper is 15 pages short. In order to print this document using the remaining 5 pages, the N-up is set to "2UP" which is a minimum value of N-up.

Thus, in this example, the setting information includes (1) a printing mode of "2UP" and (2) duplex printing.

In this manner, the setting information calculation section 142 produces the setting information, thereby setting a reduction printing mode in which data for two pages is printed on one page, and a duplex printing mode. In this manner, printing is performed in such a way that the printed characters can be as large as possible by the setting reduction printing mode and duplex printing mode.

If it is determined at step S354 that the received data is image data, the image forming section 84 is activated, and produces image forming data (e.g. bit map data) based on the received image data (step S355). Then, the totalizing section 87 is activated, calculates the number of sheets to be printed from the image forming data (step S356), and adds the thus calculated number of sheets to the accumulated number of sheets (step S357). In this manner, the accumulated number of sheets is calculated for each user.

The totalizing section 87 makes a decision to determine whether the accumulated number of sheets for the user has exceeded the threshold value stored in the threshold storing section 86 (step S358). If the answer is YES, then the printer configuration storing section 103 is activated. The printer configuration storing section 103 reads the presence or absence of the duplex printing unit in the printer 140, the sizes of paper held in the respective trays, and the types of paper in the respective trays. The printer configuration storing section 103 produces these items of information as printer configuration information and then outputs these items of information to the notification section 88 (step S359).

The notification section 88 sends the printer configuration information and remaining number of sheets to the computer 125 via the communication section 71 (step S360). These items of information are displayed on the display 20 (step S314 in FIG. 15), so that the user can know prior to the next printing operation whether printing can be performed without exceeding the upper limit.

Thereafter, the printer 140 performs printing with the image forming data (step S361). If it is determined at step S358 that the accumulated number of sheets for the user has not exceeded the threshold value stored in the threshold storing section 86, the program proceeds to step S361 where printing is performed with the image forming data.

The flowchart in FIG. 16 does not address the operation when the accumulated number of sheets for the user has reached the upper limit (e.g. 1000). For example, the flowchart may be modified as follows: Step 361 may be preceded by a step in which the accumulated number of sheets is compared with the upper limit for the user. If the accumulated number of sheets is not more than the upper limit, the program proceeds to step S361 where printing is performed. If the accumulated number of sheets is more than the upper limit, the program proceeds to step S362 where the received data is cleared and the program ends.

As described above, the printer 140 notifies the computer 125 of the setting information that ensures printing without the number of printed pages exceeding the upper limit, and the user sets the settings for outputting the image based on the setting information prior to printing. This not only allows printing without the exceeding the upper limit of the number of sheets assigned to the user, but also prevents the user from printing despite that fact that the number of sheets exceeds the upper limit.

In the third embodiment, the number-of-sheets information is extracted on the computer side. However, the number-of-sheets information may also be extracted on the printer side.

In the third embodiment, the computer receives the setting information which in turn is displayed to the user. If the user commands to output the image data to the printer, then the settings for outputting the image are automatically set and the image data is outputted to the printer. Instead, the image forming system may be configured such that the user sets, through the display screen, individual setting for outputting the image.

Fourth Embodiment

Figure 17:
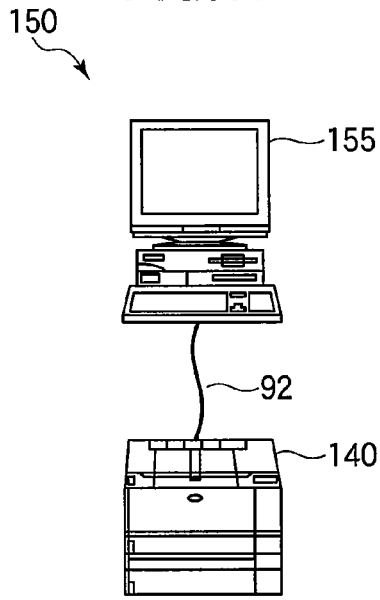
FIG. 17 is a block diagram illustrating the overall configuration of an image forming system according to a fourth embodiment.

FIG. 17 is a block diagram illustrating the overall configuration of an image forming system 150 according to a fourth embodiment. Referring to FIG. 17, the image forming system 150 includes a computer 155 that serves as an image producing apparatus and a printer 140 that serves as an image forming apparatus. The computer 155 and printer 140 are connected via a cable 92.

Figure 18:
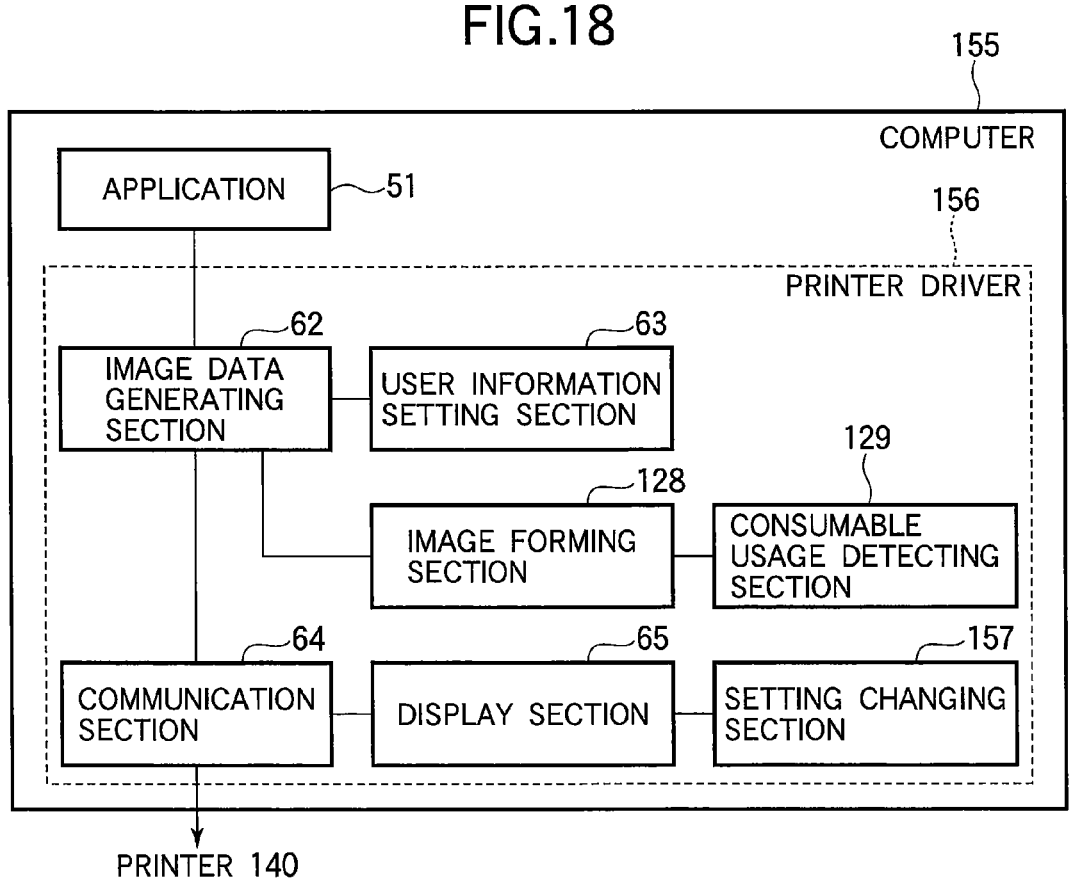
FIG. 18 is a block diagram of the computer.

FIG. 18 is a block diagram of the computer 155.

The block diagram in FIG. 18 differs from that in FIG. 13 in that a setting changing section 157 is additionally used. Elements similar to those in the third embodiment have been given the same reference numerals and the description is omitted. A description will be given of those different from the third embodiment.

Referring to FIG. 18, the computer 155 includes an application 51 and a printer driver 156. The application 51 outputs various instructions for producing image data. The printer driver 156 receives notification from the application 51, produces image data, and communicates with a printer 140. The printer driver 156 includes an image data generating section 62, a user information setting section 63, a communication section 64, and a display section 65, the image forming section 128, the consumable usage detecting section 129, and the setting changing section 157.

The respective sections are the same as those in the third embodiment except for the setting changing section 157. When the computer 155 outputs image data produced in accordance with the setting information received from the printer 140, it is very likely that the same settings for outputting the image as the preceding printing are required. Therefore, the settings for outputting the image data are set to the printer driver 156 by default.

The printer 140 in the image forming system 150 is the same as that in the image forming system 120 according to the third embodiment.

Figure 19:
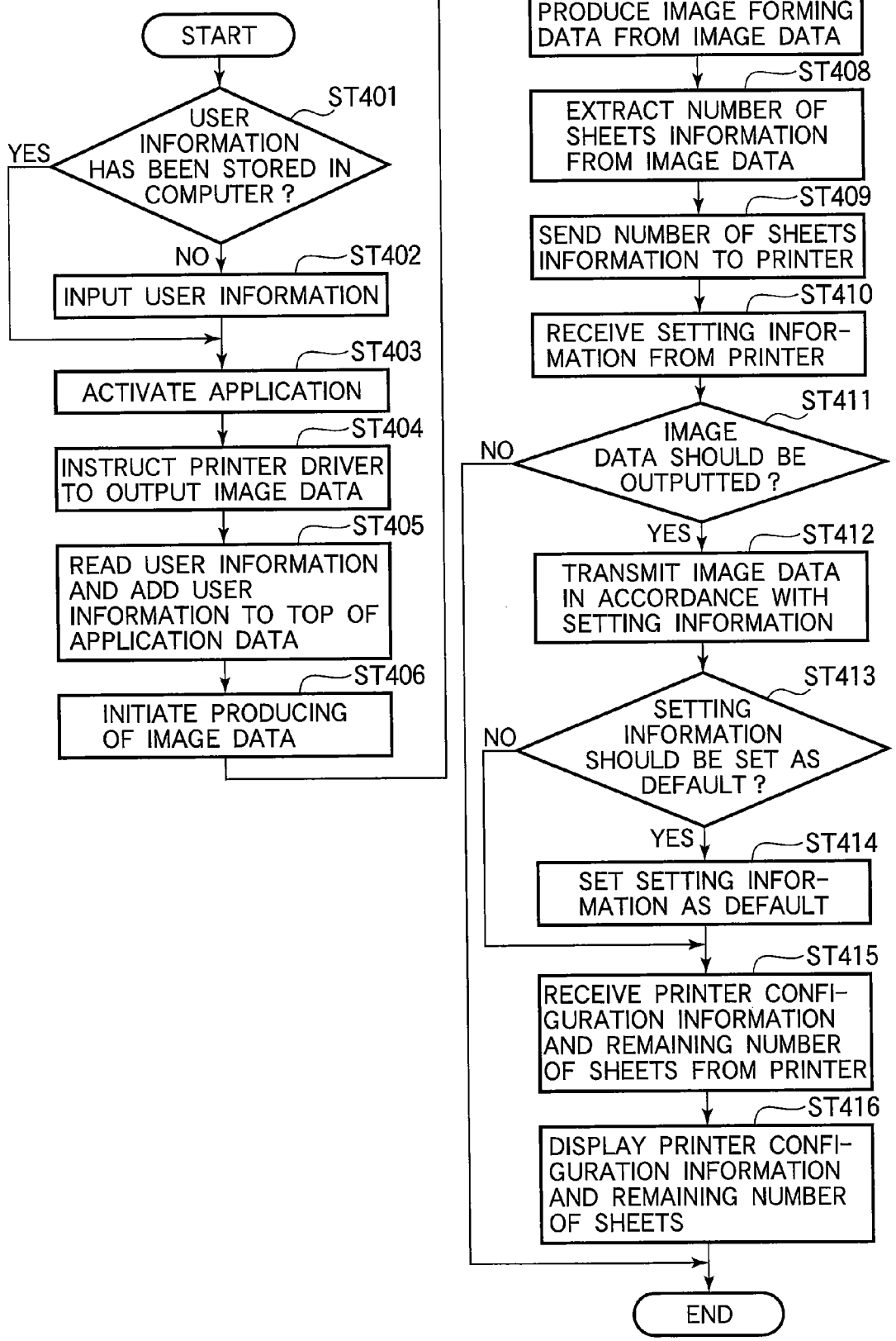
FIG. 19 is a flowchart illustrating the operation of the image forming system.

FIG. 19 is a flowchart illustrating the operation of the image forming system 150. The operation of the image forming system 150 of the aforementioned configuration will be described with reference to FIG. 2, FIG. 18, and FIG. 19.

The user checks whether his user information has been stored in the computer 155 (step S401). If the answer is NO, the user inputs his user information from the key board 19, the user information being stored into a memory 21 (step S402). Then, the user operates the key board 19 to activate the application 51 (step S403). In order to print the application data such as a document, the application 51 instructs the printer driver 127 to output image data to the printer 140 (step S404).

The user information setting section 63 is activated, and reads the user information from the memory 21 and adds the user information to the top of the application data (step S405). Then, the image data generating section 62 is activated and initiates producing image data (step S406). Then, the image forming section 128 is activated and then generates the image forming data (bit map data) based on the image data produced by the image data generating section 62 (step S407). Further, the consumable usage detecting section 129 is activated and then extracts the number-of-sheets information i.e., the number of sheets necessary for print the image data (step S408) and sends the number-of-sheets information to the printer 140 (step S409).

Then, the computer 155 receives the setting information produced that was produced by the printer 140 based on the number-of-sheets information (step S410). The setting information is to specify various settings for printing such that the printer 140 prints out the image data without the number of sheets exceeding the upper limit. The setting information includes, for example, a duplex printing mode.

The printer driver 156 displays the received setting information for the user to decide whether the image data should be outputted to the printer 140 in response to the received setting information (step S411). If the answer is NO, the program ends. The image data is not outputted to the printer 140 if the computer is unable to output in accordance with the setting information due to, for example, the fact that the specified reduction ratio is too large.

If the answer is YES at step S411, then the printer driver 156 produces the image data in accordance with the setting information received from the printer 140, and then transmits the image data to the printer 140 (step S412). Then, the printer driver 156 checks the user to determine whether the content of the setting information should be set as a default value (step S413). If the answer is YES at step S413, the printer driver 156 sets the settings for outputting the image, received from the printer 140, as a default value of the printer driver 156 (step S414).

Thereafter, the printer driver 156 receives printer configuration information and remaining number of sheets from the printer 140 (step S415). Further, the display section 65 is activated and displays the received printer configuration information and remaining number of sheets to the user on the display 20 (step 416).

The operation of the printer 140 in the image forming system 150 is the same as that of the printer 140 in the image forming system 120 according to the third embodiment.

As described above, when the remaining number of sheets that the user is allowed to print is approaching the upper limit, if the settings for outputting the image for the next printing operation is likely to be changed in the same manner, the settings for outputting the image received from the printer 140 can be set as a default value, so that alteration of the settings for outputting the image data may be minimized for the next printing operation. This reduces the complexity of repeating alteration of the same setting items every time a printing operation is performed after the remaining number of sheets that the user is allowed to print is approaching the upper limit.

While the embodiments have been described in terms of a printer, the invention is not limited to printers. The present invention may be applicable to many other apparatuses such as facsimile machines and multi function printers (MFP).

What is claimed is:

1. An image forming apparatus that forms images based on image data received from an external device, the apparatus comprising:
    a first storing section that holds a first value indicative of an upper limit of accumulated amount of a consumable consumed in forming images;
    a second storing section that holds a second value smaller than the first value;
    an image forming section that forms the image based on the image data;
    a totalizing section that holds a third value indicative of the accumulated amount of the consumable consumed in forming the images, wherein when an image is formed, said totalizing section detects an amount of the consumable required in forming the image and then adds the detected amount of consumable to the third value to update the third value; and
    a notification section that outputs a fourth value indicative of a remaining amount of the consumable available before the third value reaches the first value, the fourth value being outputted when the third value exceeds the second value.

2. The image forming apparatus according to claim 1, wherein the fourth value is produced based on the first value and the third value.

3. The image forming apparatus according to claim 1, wherein the fourth value is a difference between the first value and the third value.

4. The image forming apparatus according to claim 1 further comprising an operator panel that an operator operates to input various items of information;
    wherein the first value is input by the operator through said operator panel.

5. The image forming apparatus according to claim 1 further comprising an operator panel that the operator operates to input various items of information;
    wherein the second value is input by the operator through said operator panel.

6. An image forming apparatus that forms images based on image data received from an external device, the apparatus comprising:
    a first storing section that holds a first value indicative of an upper limit of accumulated amount of a consumable consumed for forming the images;
    a second storing section that holds a second value smaller than the first value;
    an image forming section that forms the images based on the image data;
    a totalizing section that holds a third value indicative of the accumulated amount of the consumable consumed in forming the images, wherein said totalizing section detects an amount of the consumable consumed when an image is formed, and then adds the detected amount of consumable to the third value to update the third value; and
    a notification section that outputs a difference between the first value and the third value, consumable information, and printing mode that are required for forming the image without the third value exceeding the first value, the difference being outputted when the third value exceeds the second value.

7. The image forming apparatus according to claim 6, wherein the printing mode includes compressed printing.

8. The image forming apparatus according to claim 6, wherein the printing mode includes duplex printing.

9. The image forming apparatus according to claim 6, wherein the printing mode is a toner saving mode.

10. The image forming apparatus according to claim 6, wherein the printing mode includes information on resolution.

11. An image forming system including an image producing apparatus that produces image data and an image forming apparatus that forms images in accordance with the image data, wherein the image producing apparatus comprises:
    an image data generating section that produces the image data based on setting information that specifies settings such that an image is formed without an accumulated amount of a consumable exceeding an upper limit;
    a consumable usage detecting section that detects usage information from the image data, the usage information representing an amount of the consumable that is consumed in forming the image;

a communication section that sends the image data and the usage information to the image forming apparatus and receives the setting information from the image forming apparatus; and a display section that displays the setting information received from the image forming apparatus;

wherein the image forming apparatus comprises:

a first storing section that holds a first value indicative of the upper limit;

a second storing section that holds a second value smaller than the first value;

an image forming section that forms the image based on the image data;

a totalizing section that holds a third value indicative of the accumulated amount of consumable, wherein said totalizing section detects an amount of consumable consumed in forming the image, and then adds the detected amount of consumable to the third value to update the third value;

a third storing section that stores consumable information and printing mode information on the image forming apparatus;

a setting information calculation section that calculates the setting information based on the usage information, the first value, the second value, the third value, the consumable information, and printing mode information; and a notification section that notifies the image producing apparatus of the setting information.

12. The image forming system according to claim 11, wherein the image producing apparatus sets the settings in forming for outputting the image, the settings being set based on the setting information.

13. The image forming system according to claim 11, wherein the image producing apparatus stores the settings for outputting the image by default.

14. The image forming system according to claim 11, wherein the first value is received from the image producing apparatus.

15. The image forming system according to claim 11, wherein the second value is received from the image producing apparatus.

* * * * *